April 24, 1934.　　G. H. GLEASON ET AL　　1,956,420
TREATING SEWAGE
Filed May 22, 1933
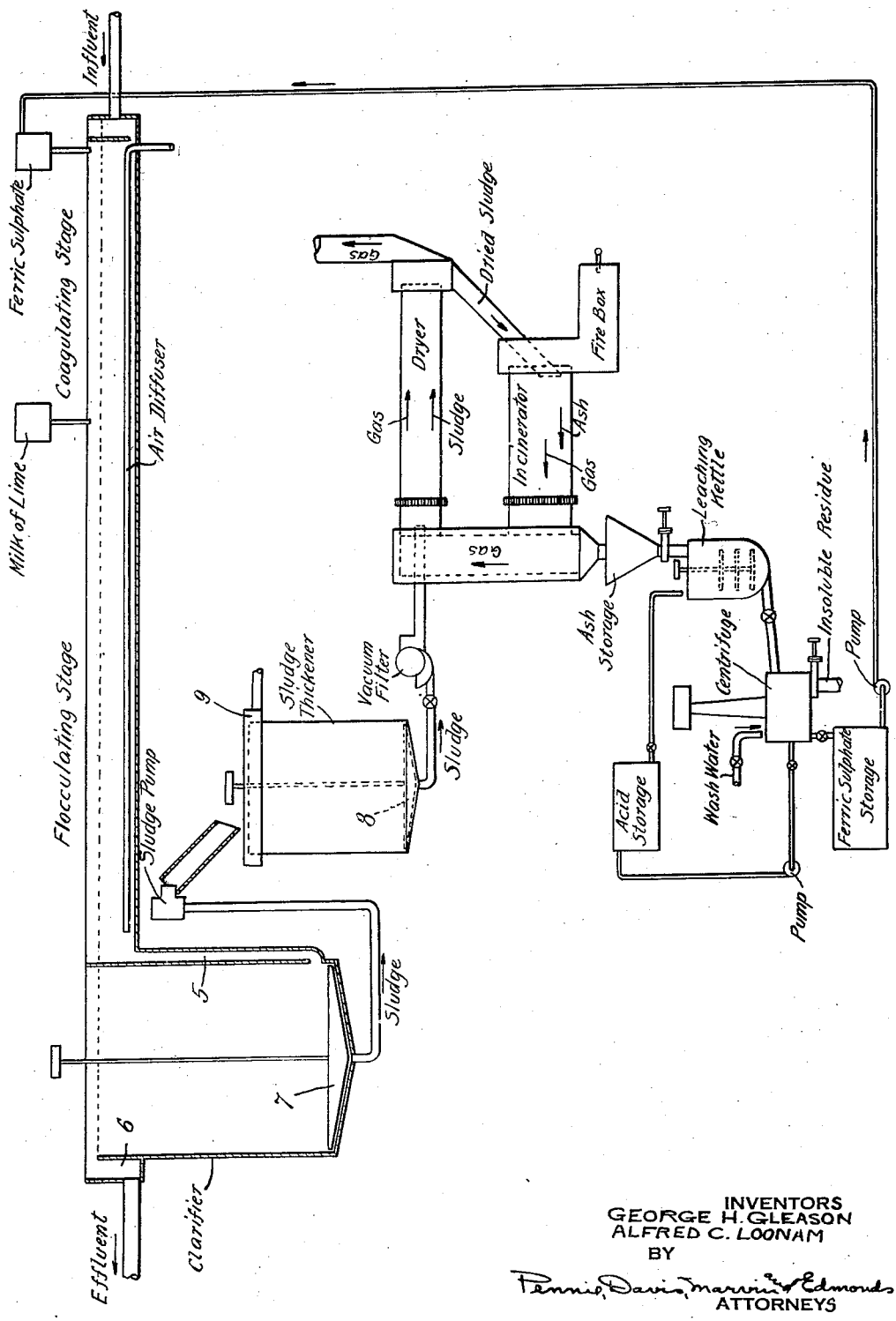
INVENTORS
GEORGE H. GLEASON
ALFRED C. LOONAM
BY
Pennie, Davis, Marvin & Edmonds
ATTORNEYS Patented Apr. 24, 1934

1,956,420

UNITED STATES PATENT OFFICE 1,956,420

TREATING SEWAGE

George Homer Gleason, Montclair, N. J., and Alfred C. Loonam, Brooklyn, N. Y., assignors to Guggenheim Brothers, New York, N. Y., a copartnership Application May 22, 1933, Serial No. 672,144

14 Claims. (Cl. 210—2)

This invention relates to the treatment of sewage and has for its object the provision of certain improvements therein. More particularly, the invention aims to improve the removal of suspended putrescible matter from sewage by the coagulating and flocculating action of a tri-valent metal, preferably iron, together with an alkali, such as lime. The invention can be applied with particular advantage in the first stage of the sewage treating process described in our United States Patent No. 1,886,267, November 1, 1932.

In ordinary raw sewages and similar waste liquors, putrescible matter, consisting of carbon, hydrogen, sulphur, etc. in various combinations, is present in two forms, namely: (1) insoluble (suspended matter), (2) soluble. In any sewage treating operation, it is customary to remove the coarser and heavier insoluble matter by screening. After screening, the concentration of the insoluble putrescible matter remaining in the sewage is extremely low, for example an average municipal sewage contains around 150 to 200 parts per million of dispersed or finely divided solid matter largely in colloidal suspension. This finely divided putrescible matter includes simple and complex compounds resulting from the breaking down of proteins.

Our present invention contemplates certain improvements in the removal of such suspended putrescible matter from sewage by coagulation, flocculation or entrainment in a settleable sludge. We have discovered, in the course of an exhaustive investigation of the subject, that the removal of such suspended putrescible matter from sewage is promoted and beneficiated by careful regulation and control of the coagulating agents added to the sewage and of the manipulative steps of the operation. Thus, we have found that ferric sulphate has a definitely high coagulating effect upon the suspended putrescible matter, and it is our belief that the sulphate radical aids in breaking down the complex colloids to simpler ones, including amino acids. We have found it advantageous to first treat the sewage with ferric sulphate with a detention period of from 5 to 15 minutes, during which the sewage is agitated with air. We have found that flocculation of the suspended matter in the so-treated sewage is promoted and effectively completed by next agitating the sewage in the presence of added alkali in amount sufficient to give the sewage a pH in excess of 7. In clarifying sewage, we find it of particular advantage to introduce the sewage into the clarifier underneath a layer or blanket of settling sludge so that the liquor flows upwardly through this sludge blanket and overflows from the clarifier with a practically negligible amount of suspended matter. Our present invention involves the application of these discoveries, alone or in combination.

In carrying out the invention, in its preferred and complete form, the incoming sewage, after appropriate screening, is treated first with soluble iron, in the form of ferric sulphate solution of 50 grams per liter concentration. Prompt diffusion of the solution throughout the sewage is obtained by air agitation. The oxygen in the air keeps the iron in the ferric condition. The incoming raw sewage ordinarily has a pH of around 7 to 7.5. In the coagulating treatment of the invention, the tri-valent metal ions are precipitated, probably in the form of ferric hydroxide as well as in the form of simple and complex organic ferric compounds. The sulphate ions of the added ferric sulphate solution lower the pH of the sewage to from 5 to 6.5, depending upon the amount of ferric sulphate added and the initial pH of the incoming sewage. In the majority of cases substantially all of the iron is precipitated in this operation. A blanket of ferric hydroxide, in a medium having a pH of 5 to 6.5, is formed and acts as a collector of suspended matter. The amount of iron added to the sewage depends, to some extent at least, upon the amount of suspended putrescible matter therein. With the average municipal sewages from 20 to 50 parts per million of iron in the form of a solution of ferric sulphate produce satisfactory coagulation and precipitation of the suspended solids. The operation should be continued for at least five minutes in order to obtain the optimum coagulation. Satisfactory aeration is obtained with from 0.03 to 0.1 cubic feet of air per gallon of sewage treated.

The sewage is next subjected to a flocculating treatment in the presence of added alkali, such as lime, in amount sufficient to give a pH consistent with maximum settling rate and optimum operation of the subsequent sludge filtration. Lime is preferable to other alkalies for this operation because it gives a denser floc and one which settles very rapidly, and furthermore, it is relatively inexpensive. The addition of lime to the sewage preferably takes place at the inlet of a tank equipped with an appropriate agitating mechanism, which serves to disperse the lime and condition the floc. It is now our preferred practice to agitate the sewage with about 0.03 to 0.1 cubic feet of air per gallon. The time of flocculation, or detention period of the sewage in the flocculating stage, should be regulated to obtain the optimum settling rate and filtering rate. If flocculated for a long period there is a tendency to revert back to the dispersed condition. Satisfactory results are obtained under average conditions with a flocculating period of about 5 to 15 minutes.

Lime is preferably added to the sewage as milk of lime in 50 grams per liter concentration. Sufficient lime is added to give a pH in excess of 7. Where dissolved putrescible matter is to be subsequently removed from the sewage liquor by a base exchange (zeolite) treatment, it is preferable to carefully regulate the amount of lime added to the sewage to give a pH of about 7.2 to 7.6. In other cases, the pH of the sewage after flocculation with lime may be as high as 9, although there is no great increase in the rate of settling of the sludge above a pH of 7.8, or in other words, the increase in settling rate does not compensate for the extra lime required to obtain the high pH figure.

Following the flocculating treatment, the sewage passes to a clarifier, into which it is introduced near the bottom, passing upward through a blanket of settling sludge. Clarified liquor overflows and settled sludge is removed from the bottom of the clarifier, preferably being raked or otherwise mechanically worked along the bottom of the clarifier towards the sludge discharge outlet. The supernatant liquor is substantially free from suspended matter and may advantageously be subjected to a base exchange treatment as described in our aforementioned patent.

The sludge from the bottom of the clarifier is pumped to a suction filter, where its moisture content is reduced by about 80%. Thus, the moisture in the sludge fed to the filter may be around 93% and the moisture in the filter cake around 70 to 75%. It is our preferred practice to completely destroy the organic matter in the filter cake by incineration. A rotary kiln incinerator consisting of two sections, namely, a drying section and a burning section is admirably adapted for the purpose. In both the dryer and incinerator sections of the unit the air travels concurrently with the solids and gases. The dryer section is operated at a temperature which does not cause decomposition or carbonization of the sludge, and the incinerator section is operated at a temperature of about 650–700° C. This incinerating temperature is sufficiently high to destroy the putrescible matter. The incinerating temperature is preferably kept below 700° C. so that sintering of the residue is avoided. A substantial amount of the heat required for incinerating is obtained by the burning of the sludge. In fact, the calorific value of the sludge is such that in a large scale operation no extraneous fuel is required for incineration.

A typical incinerated residue or ash obtained in the foregoing manner has the following analysis:

Incinerated residue:
| | |
|---|---|
| $Fe_2O_3$ | 41.2% |
| $Al_2O_3$ | 8.68 |
| CaO | 7.32 |
| MgO | 1.31 |
| $CaSO_4$ | 4.20 |
| $CaCO_3$ | 1.87 |
| $Na_2O$ | .30 |
| $SiO_2$ | 24.00 |
| Other constituents | 9.34 |
| Loss on ignition | 1.78 |

This incinerated residue is treated with sulphuric acid for the regeneration of ferric sulphate, which is again used for coagulation. The regenerated ferric sulphate gives better coagulation than does C. P. ferric sulphate or any other commercial form of ferric sulphate known to us. It is our belief that this superior action of regenerated ferric sulphate is due, in part at least, to the presence of a substantial amount of aluminum, another tri-valent metal having a high coagulating effect upon the suspended putrescible matter in the sewage. The small amount of insoluble matter, consisting principally of the silica, remaining after the treatment of the incinerated residue with sulphuric acid, is filtered off and discarded.

The single figure of the accompanying drawing is a diagrammatic flow sheet of a system adapted for the practice of the invention.

The raw sewage is first passed through a coarse screen and then through a fine screen (not shown in the drawing) to remove coarse and heavy solid matter. The screened influent is then subjected to the two-stage coagulating and flocculating treatments of the invention. In the apparatus illustrated in the drawing these treatments are carried out successively in a long tank or basin one end of which receives the incoming sewage influent and the other end discharges into a clarifier. Ferric sulphate solution is added to the sewage as it enters the coagulating stage and prompt diffusion of the solution throughout the sewage is obtained by air agitation. In this apparatus, the rate of flow of the sewage through the coagulating stage is such as to give a detention period of about five minutes. Milk of lime is then added to the sewage and flocculation of coagulated matter is promoted by air agitation. A common air diffuser extends throughout the length of the basin and provides the contemplated agitation during both coagulation and flocculation. The rate of flow of the sewage is such as to provide a detention period of about ten minutes during the flocculating stage.

The clarifier illustrated in the drawing comprises a tank having a peripheral charging well 5 (extending approximately around one third of the circumference of the tank) and discharging into the bottom of the tank. Clarified liquor overflows in a launder 6 opposite the charging well and extending approximately around one-third of the upper circumference of the tank. A raking mechanism 7 moves sludge settling on the bottom of the tank towards the centrally positioned sludge discharge outlet. It is to be understood that other forms and types of clarifier may be used in practicing the invention. We have found that the introduction of the sewage near the bottom of a settling chamber beneath a settling mass of sludge therein materially aids in the production of a supernatant liquor substantially free from suspended matter.

Sludge from the clarifier is pumped to a thickener having a sludge raking mechanism 8 and an overflow launder 9. The clarifier and thickener effluents may be combined for appropriate disposal or for subsequent treatment, as for example by zeolite filters as described in our aforementioned patent.

The sludge from the thickener is conveyed (by pumping if necessary) to a suction filter and the resulting filter-cake is conveyed to the dryer and incinerator. Both the dryer and incinerator are rotatably mounted cylinders in which the solid material and gases (for drying and incinerating) travel concurrently. Thus, the exhaust gas from the incinerator moves through the dryer concurrently with the sludge, and the dried sludge enters the incinerator along with hot gases from an oil burner or other heating means. An adequate amount of oxygen or other combustion supporting gas enters the incinerator (along with the hot gases of combustion of the extraneous fuel) to burn the organic and other combustible matter in the dried sludge. The incinerated residue or ash is discharged from the incinerator to a storage container from whence it is appropriately fed to a jacketed leaching kettle. In the kettle, the incinerated residue is treated with sulphuric acid, being appropriately agitated and also heated if necessary, for the regeneration of ferric sulphate. The contents of the kettle is delivered to a centrifuge for the removal of excess acid. The centrifuged cake is leached with water to dissolve the ferric sulphate present and the insoluble residue is filtered off and discarded. The regenerated ferric sulphate solution is pumped back for reuse in the coagulation of fresh incoming sewage.

It will of course be understood that the apparatus illustrated in the drawing is merely illustrative and is not intended to be restrictive of the invention in any respect.

In the following table there is given the daily results obtained over a period of ten days by the practice of the present invention in a plant of thirty-thousand gallons per day capacity substantially conforming with that illustrated in the drawing. The biochemical oxygen demand (B. O. D.), suspended matter, organic nitrogen, and ammonia nitrogen are given in parts per million. The purified effluent was the supernatant liquor from the clarifier:

|  | B. O. D. | | Suspended | |
| --- | --- | --- | --- | --- |
|  | Raw influent | Purified effluent | Raw influent | Purified effluent |
| April 18 | 116 | 20 | 108 | 30 |
| April 19 | 98 | 17 | 90 | 30 |
| April 20 | 118 | 21 | 104 | 23 |
| April 21 | 100 | 25 | 102 | 13 |
| April 22 | 101 | 21 | 100 | 6 |
| April 23 | 135 | 27 | 86 | 42 |
| April 24 | 140 | 27 | 126 | 18 |
| April 25 | 127 | 24 | 156 | 13 |
| April 26 | 132 | 26 | 116 | 11 |
| April 27 | 158 | 25 | 146 | 13 |

|  | Organic N | | Ammonia N | |
| --- | --- | --- | --- | --- |
|  | Raw influent | Purified effluent | Raw influent | Purified effluent |
| April 18 | 9 | 2.6 | 6.2 | 7.8 |
| April 19 | 7.8 | 1.8 | 7. | 8.2 |
| April 20 | 9. | 2.4 | 7.4 | 7.6 |
| April 21 | 8. | 2.6 | 7.2 | 7.2 |
| April 22 | 7.8 | 2.6 | 9. | 7.4 |
| April 23 | 9.2 | 4. | 8. | 7.6 |
| April 24 | 9. | 3.2 | 7.8 | 8.4 |
| April 25 | 11.2 | 3.6 | 8. | 7.8 |
| April 26 | 10.2 | 2.8 | 9. | 9.4 |
| April 27 | 10. | 3.2 | 9.2 | 9. |

We claim:

1. The improvement in the treatment of sewage containing putrescible matter which comprises diffusing a soluble iron compound throughout the sewage by air agitation with a detention period of several minutes, subsequently to the detention period agitating the so-treated sewage in the presence of an added alkali in amount sufficient to give the sewage a pH in excess of 7 and thereby flocculating the suspended matter therein, and separating the suspended matter from the accompanying liquor.

2. The improvement in the treatment of sewage containing putrescible matter which comprises introducing a soluble iron compound into sewage and diffusing the compound throughout the sewage by air agitation with a detention period of several minutes, subsequently to the detention period agitating the so-treated sewage now having a pH not lower than 5 in the presence of an added alkali in amount sufficient to give the sewage a pH in excess of 7 and thereby flocculating the suspended matter therein, then introducing the sewage into a settling chamber beneath a settling mass of sludge therein, and withdrawing settled sludge from the bottom of said chamber and clarified liquor from the top thereof.

3. The improvement in the treatment of sewage containing suspended putrescible matter which comprises coagulating the suspended putrescible matter by air agitation in the presence of ferric sulphate with a detention period of several minutes, after said detention period subjecting the so-treated sewage to a flocculating treatment in the presence of added lime in amount sufficient to give the sewage a pH in excess of 7, introducing the sewage into a settling chamber beneath a settling mass of sludge therein, and withdrawing settled sludge from the bottom of said chamber and clarified liquor from the top thereof.

4. The improvement in the treatment of sewage containing suspended putrescible matter which comprises introducing ferric sulphate into the sewage and agitating the sewage with air for a period of several minutes, the amount of ferric sulphate introduced into the sewage being such that the sewage has a pH of 5 to 6.5, subsequently to said period of agitation treating the sewage with lime in amount sufficient to give the sewage a pH in excess of 7, then introducing the sewage near the bottom of a settling chamber beneath a settling mass of sludge therein, and withdrawing settled sludge from the bottom of said chamber and clarified liquor from the top thereof.

5. The improvement in the treatment of sewage containing suspended putrescible matter which comprises introducing a soluble iron compound into the sewage and diffusing the compound throughout the sewage by suitable agitation with a detention period of several minutes, adding to the so-treated sewage after said detention period, lime in amount sufficient to give the sewage a pH in excess of 7, and separating the suspended matter from the accompanying liquor.

6. The improvement in the treatment of sewage containing suspended putrescible matter which comprises introducing a soluble compound of a tri-valent metal into the sewage and diffusing the compound throughout the sewage by suitable agitation with a detention period of several minutes, adding to the so-treated sewage after said detention period, lime in amount sufficient to give the sewage a pH in excess of 7, and separating the suspended matter from the accompanying liquor.

7. The improvement in the treatment of sewage containing suspended putrescible matter which comprises introducing ferric sulphate into the sewage and diffusing the ferric sulphate throughout the sewage by suitable agitation with a detention period of several minutes, adding to the so-treated sewage after said detention period, lime in amount sufficient to give the sewage a pH in excess of 7, and separating the suspended matter from the accompanying liquor.

8. The improvement in the treatment of sewage containing suspended putrescible matter which comprises subjecting the sewage to air agitation in the presence of a soluble iron compound for a period of several minutes, after said period subjecting the thus treated sewage to the action of an amount of alkali sufficient to establish a pH between 7.0 and 9.0, and separating the suspended matter from the accompanying liquor.

9. The improvement in the treatment of sewage containing suspended putrescible matter which comprises subjecting the sewage to air agitation in the presence of ferric sulphate for a period of several minutes, after said period subjecting the thus treated sewage to the action of an amount of alkali sufficient to establish a pH between 7.0 and 9.0, and separating the suspended water from the accompanying liquor.

10. The improvement in the treatment of sewage containing suspended putrescible matter which comprises subjecting the sewage to air agitation in the presence of a soluble salt of a tri-valent metal for a period of several minutes, after said period subjecting the thus treated sewage to the action of an amount of alkali sufficient to establish a pH between 7.0 and 9.0, and separating the suspended matter from the accompanying liquor.

11. The improvement in the treatment of sewage containing suspended putrescible matter which comprises subjecting the sewage to air agitation in the presence of ferric sulphate for a period of several minutes, after said period subjecting the thus treated sewage to the action of an amount of alkali sufficient to establish a pH between 7.0 and 9.0, then introducing the sewage into a settling chamber beneath a settling mass of sludge therein, withdrawing settled sludge from the bottom of said chamber and clarified liquor from the top thereof.

12. The improvement in the treatment of sewage containing suspended putrescible matter which comprises subjecting the sewage to air agitation in the presence of ferric sulphate for a period of several minutes, after said period subjecting the thus treated sewage to the action of an amount of alkai sufficient to establish a pH between 7.2 and 7.8, then introducing the sewage into a settling chamber beneath a settling mass of sludge therein, and withdrawing settled sludge from the bottom of said chamber and clarified liquor from the top thereof.

13. The improvement in the treatment of sewage containing suspended putrescible matter which comprises subjecting the sewage to air agitation in the presence of a soluble salt of a tri-valent metal for a period of several minutes, after said period subjecting the thus treated sewage to the action of an amount of alkali sufficient to establish a pH between 7.2 and 7.8, then introducing the sewage into a settling chamber beneath a settling mass of sludge therein, and withdrawing settled sludge from the bottom of said chamber and clarified liquor from the top thereof.

14. The improvement in the treatment of sewage containing suspended putrescible matter which comprises subjecting the sewage to air agitation in the presence of ferric sulphate in an amount equivalent to about 20 to 50 parts per million of iron for a period of several minutes, after said period subjecting the thus treated sewage to the action of an amount of alkali sufficient to establish a pH between 7.2 and 7.8, then introducing the sewage into a settling chamber beneath a settling mass of sludge therein, and withdrawing settled sludge from the bottom of said chamber and clarified liquor from the top thereof.

GEORGE HOMER GLEASON.
ALFRED C. LOONAM.